UNITED STATES PATENT OFFICE.

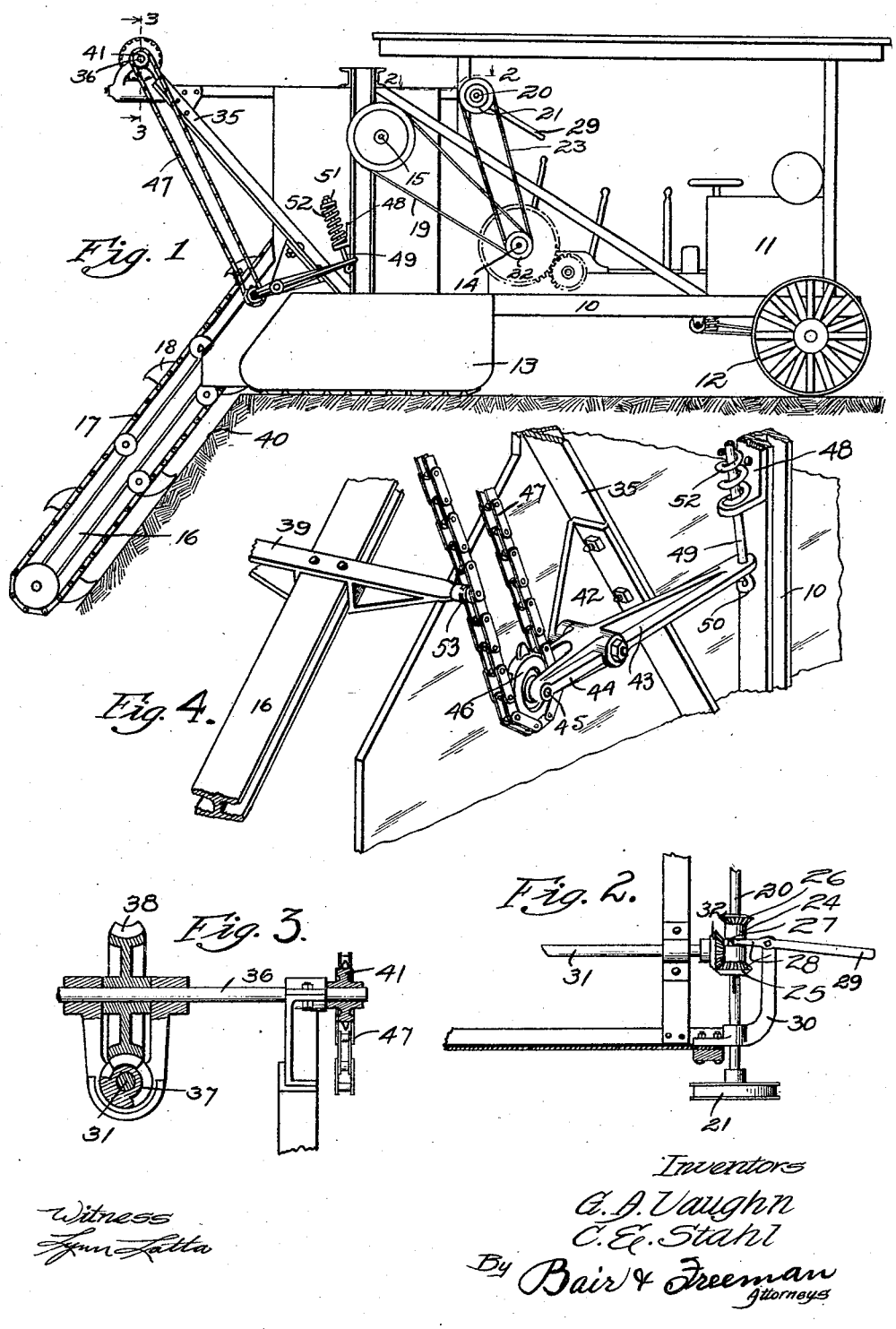

GEORGE A. VAUGHN AND CHARLES E. STAHL, OF NEWTON, IOWA, ASSIGNORS TO THE PARSONS COMPANY, OF NEWTON, IOWA.

DIGGING MACHINE.

1,418,109. Specification of Letters Patent. Patented May 30, 1922.

Application filed July 16, 1921. Serial No. 485,279.

*To all whom it may concern:*

Be it known that we, GEORGE A. VAUGHN and CHARLES E. STAHL, citizens of the United States, and residents of Newton, in the county of Jasper and State of Iowa, have invented a certain new and useful Digging Machine, of which the following is a specification.

The object of our invention is to provide an improvement in digging machines, comprising a digging element, and means of simple, durable and inexpensive construction for controlling the digging element for insuring the operation thereof with a maximum efficiency.

More particularly, it is our object to provide in connection with a pivoted boom or frame, having a series of diggers mounted thereon arranged to travel in a continuous path, novel means for yieldingly holding the digging elements against the ground to be acted upon and for raising the frame when desired.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1 shows a side elevation of a digging machine, embodying our invention.

Figure 2 shows a detail, sectional view taken on the line 2—2 of Figure 1.

Figure 3 shows a detail, sectional, view taken on the line 3—3 of Figure 1; and

Figure 4 shows a sectional, perspective view of a part of the mechanism for controlling the position of the boom of the digger frame.

In the accompanying drawings, we have used the reference numeral 10 to indicate generally the frame of a large digging or excavating machine, which is preferably self-driven, and is provided with an engine 11, steerable front wheels 12 and creeping tread devices 13.

On the main frame is a transverse shaft 14 designed to be operated from the engine in any suitable way.

Arranged at the upper rear part of the machine is a transverse shaft 15 upon which the upper end of the boom 16 is pivoted.

The digging mechanism proper has endless chains 17 on which are mounted digger elements or cutting shoes 18.

It will be understood that the chains 17 travel on sprockets at the ends of the boom 16 and that the sprockets on the upper shaft, which are of ordinary construction, are fixed to the shaft 15 and rotated with said shaft. The shaft 15 is rotated from the shaft 14 by means of the chain 19 and suitable sprockets.

The mechanism just described in itself alone forms no part of our present invention and is probably all old.

It is found in the type of digging machines in which a boom of the general type herein disclosed is pivoted to the rear end of a tractor driven machine, and is designed to dig a ditch behind the main machine, that it is desirable to provide some means for imparting yielding pressure to the boom, which carries the digging cutters and conveyors against the ground, which is being acted upon. At the same time, it is obvious that the boom must under certain circumstances be capable of being readily raised and that machinery for accomplishing this raising must be provided.

Our invention has to do particularly with the providing of a means for imparting such yielding pressure to the boom and for raising and lowering the boom.

At the upper part of the main machine is a transverse shaft 20 on one end of which is a sprocket 21 arranged in line with the sprocket 22 on the shaft 14. A chain 23 travels on the sprockets 21 and 22 for imparting rotation from the shaft 14 to the shaft 20.

On the shaft 20, there is rotatably, but non-slidably mounted, a sleeve having at its ends beveled gears 24. Formed in the sleeve 24 is a groove 27 into which is projected the fingers or arm 28 of a lever 29. The shifting lever 29 is pivoted on a suitable bracket 30.

Suitable supporting frame members are provided for a shaft 31 extending fore-and-aft in the machine and having on its forward end a bevelled gear 32 arranged in mesh with the bevelled gears 24. The frame members just mentioned, we have indicated generally by the reference character 35.

On the frame members 35, there is rotatably mounted a transverse shaft 36. On the shaft 31 is a worm 37 in mesh with a worm wheel 38 on the shaft 36.

It will be seen that the parts just mentioned are so arranged that it is easy to transmit motion from the shaft 31 to the shaft 36, but hard to transmit motion from the shaft 36 to the shaft 31; that is, the gearing is self-locking so far as transmission of motion from the worm wheel to the worm gear is concerned.

On the boom 16, we have mounted a transverse bracket or frame member 39. Each end of the bracket 39 is connected with the shaft 36 and is provided with a resilient device for holding the digger elements 18 adjacent to the ground 40 during the operation of the machine.

Since these supporting and pressure devices are the same on each side of the boom, we shall describe but one of them, but it will be understood that the devices are arranged in duplicate.

Describing now, the device mentioned on the right-hand side, it may be said that there is mounted on the shaft 36, a sprocket 41. On the main frame of the machine near the upper end of the boom 16 is a bracket 42 upon which there is pivoted between its ends, a lever 43. One end of the lever 43 has the bifurcated arms 44, carrying a spindle or shaft 45, on which is a sprocket 46 aligned with the sprocket 41.

A sprocket chain 47 travels on the sprockets 41 and 46.

On the main frame adjacent to what may be called the forward end of the lever 43 is a bracket 48, in which is slidably mounted a rod 49, having on its lower end a head or the like 50 and on its upper end an adjustable nut 51. A coil spring 52 is mounted on the rod 49 between the bracket 48 and the nut 51.

One link of each sprocket chain 47 is secured, as at 53, to one end of the bracket 39.

In the practical use of our improved device, after the digging mechanism proper has been adjusted to its operative position, as illustrated for instance in Figure 1, it will be seen that by rotating the shaft 36 to a certain position, the parts may be adjusted so that the spring 52 yieldingly tends to hold the digging elements 18 on the lower chain stretches against the dirt, which is being acted upon.

Any tendency of the boom to move away from the work is counteracted by the springs 52.

In some instances, the weight of the boom and the digging mechanism mounted thereon is sufficient to cause the cutters to cut into the ground properly.

However, it will be readily recognized, that machines of this type are used in a great variety of working conditions. Sometimes the ground is much harder than at other times. Where the ground is hard and under various circumstances, it is desired that the digger elements 18 be held in proper position with relation to the dirt and be held against the dirt by a yielding pressure over and above the pressure imparted by the weight of the boom and the mechanism, which it carries.

It will be seen that the pressure of the springs 52 may be regulated to a considerable degree by adjusting the nuts 51 on the rods 49. Such pressure can also be regulated by rotating the shaft 36 a short distance and thus varying the normal position of the boom.

Whenever, it is desirable to raise the boom 16, this can be done by shifting the sleeves and the gears 24 for throwing one of said gears into engagement with the gear 32 by means of the shifting lever 29, and thereby rotating the shaft 36 for drawing the lower stretches of the chains 47 upwardly. This will carry the brackets 39 and the boom 16 for raising the boom. It will be seen that the operation may be readily reversed by shifting the gears 24.

When the boom has once been raised, the clutch may be released and the boom will be held in its then adjusted position by means of the worm gear structure hereinbefore described.

It will be seen that we have accomplished the objects hereinbefore set forth by means of a very simple and effective mechanism. We have tried to avoid the use of two sets of mechanism for accomplishing the two purposes of raising and lowering the boom and of snugly, yieldingly, holding the digger element on the boom in proper position with relation to the work.

It will be noted that the boom 16 may be quite accurately adjusted to different positions, so that the springs 52 will be effective by rotation of the shaft 36, until the boom has been adjusted. In this connection, attention is called to the importance of the structure, whereby the chains 47 are given some play at their lower parts on account of the pivoted mounting of the lever 43, and also to the arrangement, whereby when the boom has once been adjusted to position by means of the shaft 36, the chains are held against any movement by means of the worm gear construction, which serves practically as a brake for preventing any rotation of the shaft 36 and consequent movement of the chains 47.

Some changes may be made in the arrangement and construction of the various parts of our device, without departing from the essential features and purposes of our invention, and it is our intention to cover by our claims, any modified forms of structure or use of mechanical equivalents, which may be reasonably included within their scope.

We claim as our invention:

1. In a device of the class described, the combination of a main frame, a boom pivoted at one end on said main frame and carrying digging devices arranged to travel in an endless path, a shaft, a sprocket on said shaft, a lever pivoted between its ends, a sprocket carried by one end of said lever aligned with said first sprocket, a chain on said sprockets, means for fixing said chain to said boom, and a resilient tension device operatively connected with said lever and tending to yieldingly hold said lever in position for maintaining the chain taut.

2. In a device of the class described, the combination of a main frame, a boom pivoted at one end on said main frame and carrying digging devices arranged to travel in an endless path, a shaft, a sprocket on said shaft, a lever pivoted between its ends, a sprocket carried by one end of said lever aligned with said first sprocket, a chain on said sprockets, means for fixing said chain to said boom, and a resilient tension device operatively connected with said lever and tending to yieldingly hold said lever in position for maintaining the chain taut, and a brake device for preventing holding said shaft against movement caused by the swinging of said boom.

3. In a device of the class described, the combination of a main frame, a boom pivoted at one end on said main frame and carrying digging devices arranged to travel in an endless path, a shaft, a sprocket on said shaft, a lever pivoted between its ends, a sprocket carried by one end of said lever aligned with said first sprocket, a chain on said sprockets, means for fixing said chain to said boom, and a resilient tension device operatively connected with said lever for tending to yieldingly hold said lever in position for maintaining the chain taut, and a brake device for preventing holding said shaft against movement caused by the swinging of said boom.

4. In a machine of the class described, the combination of a main frame, a boom pivotally supported at one end on said frame carrying digger devices arranged to travel in an endless path, an adjustable supporting element for said boom and a yielding device for yieldingly preventing upward swinging movement of said boom.

5. In a machine of the class described, the combination of a main frame, a boom pivotally supported at one end on said main frame carrying digger devices arranged to travel in an endless path, and means for yieldingly holding said boom against swinging movement in one direction.

6. In a machine of the class described, the combination of a main frame, a boom pivotally supported at one end on said frame carrying digger devices arranged to travel in an endless path, and a yielding device for preventing the movement of the boom away from the material being acted upon thereby.

7. In a machine of the class described, the combination of a main frame, a boom pivotally supported at one end on said frame carrying digger devices arranged to travel in an endless path, a supporting element on said boom, a transverse shaft supported on the main frame, a pivoted lever on the main frame, means for supporting one end of said lever, including a yielding element, a sprocket wheel on said lever on the opposite side of the pivot thereof from said last means, a sprocket on the shaft, a chain on said sprockets fixed to said supporting element, and means for retarding the rotation of said shaft.

8. In a device of the class described, a main frame, a boom pivoted thereon carrying digging elements mounted for movement in an endless path, a shaft, a sprocket thereon, a lever pivoted between its ends, a sprocket carried by one end of said lever, a chain on said sprockets, means for fixing said chain to said boom, means yieldably supporting the other end of said lever, and a brake device for said shaft.

Des Moines, Iowa, June 1, 1921.

GEORGE A. VAUGHN.
CHARLES E. STAHL.